(12) United States Patent
Wilson et al.

(10) Patent No.: US 6,675,827 B2
(45) Date of Patent: Jan. 13, 2004

(54) CONTROL STOP CAP FRICTION RING

(75) Inventors: John R. Wilson, Naperville, IL (US); Steven R. Oliver, Chicago, IL (US)

(73) Assignee: Sloan Valve Company, Franklin Park, IL (US)

( * ) Notice: Subject to any disclaimer, the term of this patent is extended or adjusted under 35 U.S.C. 154(b) by 91 days.

(21) Appl. No.: 10/118,819

(22) Filed: Apr. 9, 2002

(65) Prior Publication Data

US 2003/0188781 A1 Oct. 9, 2003

(51) Int. Cl.⁷ .............................................. F16K 35/10
(52) U.S. Cl. ...................... 137/382; 137/382.5; 137/377
(58) Field of Search .............................. 137/382, 382.5, 137/377

(56) References Cited

U.S. PATENT DOCUMENTS

| | | | | |
|---|---|---|---|---|
| 3,492,841 A | * | 2/1970 | Ipri | 137/382 |
| 3,709,249 A | * | 1/1973 | Diaz | 137/296 |
| 4,182,361 A | * | 1/1980 | Oakey | 137/296 |
| 4,762,144 A | * | 8/1988 | Ford | 137/382.5 |
| 5,497,802 A | * | 3/1996 | Whiteside | 137/377 |
| 5,558,120 A | * | 9/1996 | Wilson | 137/382 |
| 5,836,345 A | * | 11/1998 | Ericson | 137/382 |

* cited by examiner

*Primary Examiner*—A. Michael Chambers
(74) *Attorney, Agent, or Firm*—Cook, Alex, McFarron, Manzo, Cummings & Mehler, Ltd.

(57) ABSTRACT

A cap assembly for closing an access opening in a plumbing fitting includes a cap for rotatable attachment to the plumbing fitting, with the cap having an interior surface which faces the plumbing fitting. There is an elastomeric friction ring positioned between the cap interior surface and the plumbing fitting, which friction ring has a plurality of circumferentially spaced projections facing and in contact with the plumbing fitting. The projections are formed and adapted to require less torque when the cap is rotatably attached to the plumbing fitting than when said cap is rotatably removed from the plumbing fitting.

12 Claims, 3 Drawing Sheets

CONTROL STOP CAP FRICTION RING

THE FIELD OF THE INVENTION

Public washrooms conventionally utilize flushometers to supply a measured amount of water to either a urinal or a water closet. Associated with such flushometers is a plumbing fitting designated as a control stop. This plumbing fitting connects the flushometer with the water supply and has a valve member biased toward a closing position. The bias upon the valve member is adjustable so as to control the water supply to the flushometer. Normally, the adjustment on the control stop is not utilized once the plumbing fitting has been installed except for those instances in which it is necessary to totally shut off the water supply to a flushometer. At such time maintenance personnel will remove the stop cap and close the valve member so that water is no longer supplied to the flushometer.

Stop caps as described are subject to constant thermal change resulting from the water which passes through the stop cap becoming warm during periods of no use and then being cooled during use. This thermal cycling has the effect of loosening the stop cap. This provides a stop cap which may be loosened to the point where it may be accidentally removed or removed by vandals. In either event, it is important to have a stop cap which will stay in place, be relatively difficult to accidentally remove, be of such a construction as to discourage vandalism, but yet be removable by maintenance personnel when so required. The present invention provides a cap assembly which addresses the above shortcomings, is reliable in use, easy to manufacture, and is easier to install than it is to remove. Specifically, the cap assembly includes the conventional cap which will be threadedly attached to the stop cap body and has added thereto a friction ring having a plurality of projections which face the stop cap body, with these projections enabling the stop cap to be attached or installed with less torque than it takes to remove the cap assembly from the control stop.

SUMMARY OF THE INVENTION

The present invention relates to stop caps for plumbing fittings and particularly to a cap assembly for a control stop used in combination with a flushometer to provide water to a urinal or water closet.

A primary purpose of the invention is a cap assembly for a control stop which will not become loose during thermal cycling of the control stop.

Another purpose of the invention is to provide a cap assembly for the use described which requires less torque in application than it does for removal.

Another purpose of the invention is to provide a cap assembly as described which provides reduced torque acting on the control stop bonnet than on the stop cap itself.

Another purpose of the invention is to provide a stop cap assembly as described which includes an elastomeric friction ring having a plurality of circumferentially spaced projections which face the control stop bonnet and is applied when the stop cap is attached to the control stop.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

Figure 1:
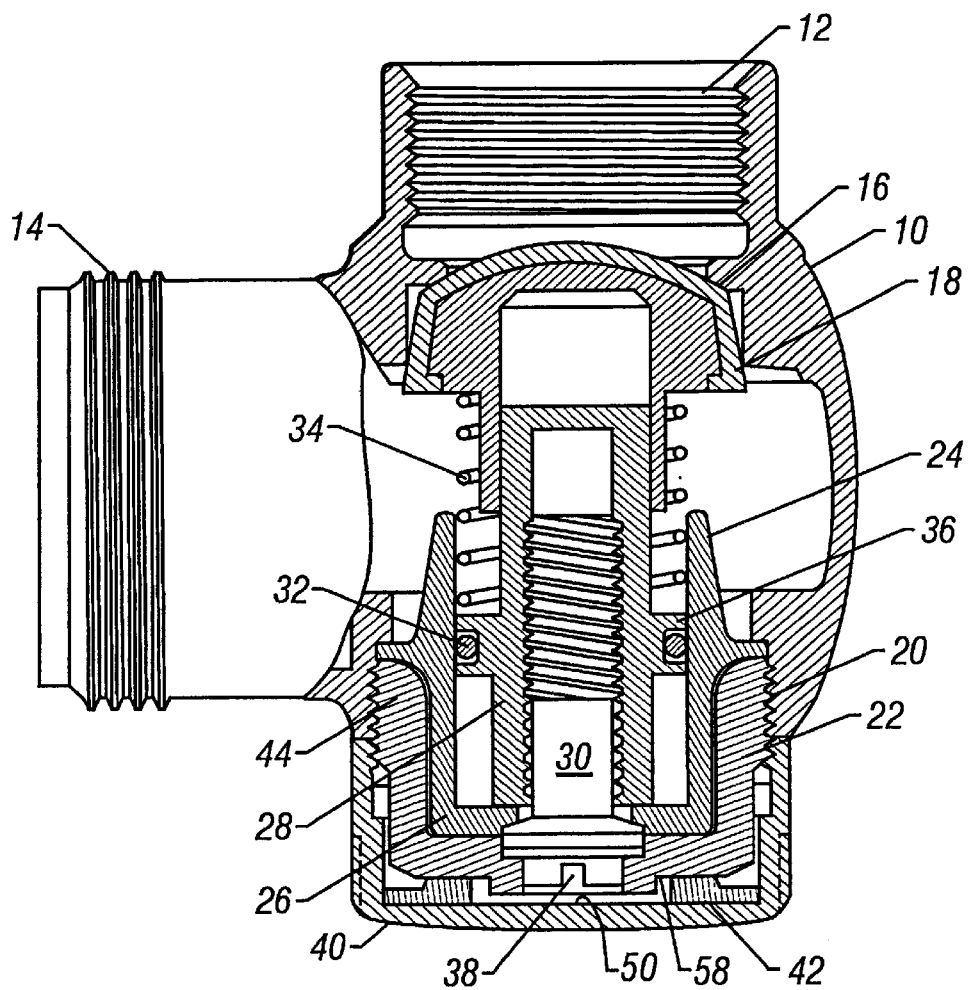
FIG. 1 is side view of a control stop, in part axial section, illustrating the cap assembly of the present invention.

Control stops are conventionally used with flushometers in public washrooms and as the name implies, both control the flow of water to the flushometer and function as a stop when it is necessary to completely close the water supply to the flushometer for maintenance or removal. Control stops are well known in this art. Because it may be necessary to move the stop to a fully closed position, it is necessary that there be access to the stop for maintenance personnel. In the prior art, the access opening was covered by a cap which was threaded onto the body of the control stop. There are problems with such a construction. First, the constant cycling between hot and cold caused by the warm temperature of the room and the cold temperature of the water results in a cap which is loosely attached to the body. Little torque is required to remove it. A second problem is vandalism and the caps are both decorative and useful to vandals for other purposes. A cap which is loose is more subject to vandalism than normal. Once the cap has been removed, the exposed stop is an invitation to an individual to either close the stop, preventing the flow of water to the flushometer, or to back off the stop, possibly resulting in flooding a urinal or closet. The present invention provides a cap assembly which eliminates the above-described problems.

U.S. Pat. Nos. 5,497,802 and 5,558,120, both assigned to Sloan Valve Company of Franklin Park, Ill., the assignee of the present application, relate to earlier stop cap assemblies for the use described. The disclosure of both patents is herein incorporated by reference.

In the drawings, the body of the control stop is indicated at 10 and has a threaded inlet 12 and a threaded outlet 14. The outlet will be connected to a flushometer and the inlet will be connected to the water supply. There is a valve seat 16 formed adjacent the inlet 12, and a valve member or plug 18 is movable to close upon the valve seat, thus shutting off the flow of water between the inlet and the outlet.

The opening for the stop is indicated at 20 and a bonnet 22 is threadedly mounted in this opening. The bonnet 22 mounts a collar and sleeve assembly 24 which includes a collar 26 holding a movable adjusting sleeve 28 which threadedly mounts a stem 30. An O-ring 32 forms a seal between the adjusting sleeve 28 and the interior of collar 26. A coil spring 34 is seated upon a shoulder 36 of the adjusting sleeve and biases the plug 18 toward the closed position shown in the drawings. As is known in the art, rotation of the stem 30 will move the adjusting plug 28 toward or away from the plug 18. This movement changes the bias applied by the spring 34 on the plug 18, thus controlling the pressure required to move the plug away from the seat 16, which movement takes place when the flushometer is operated. In order to completely close the control stop, the stem 30 will be turned through the use of the screwdriver slot 38 which will move the adjusting sleeve 28 to a position in which the plug 18 cannot be moved away from the seat 16 and will be fast upon the seat. In this position the control stop is functioning as a stop and no water can pass through it.

The cap assembly which covers the access opening 20 and thereby hides the stem 30 and its screwdriver adjusting slot 38, comprises a metallic cap 40 and a friction ring 42. The cap 40 will be threaded onto the exterior threaded portion 44 of the bonnet 22.

Figure 2:
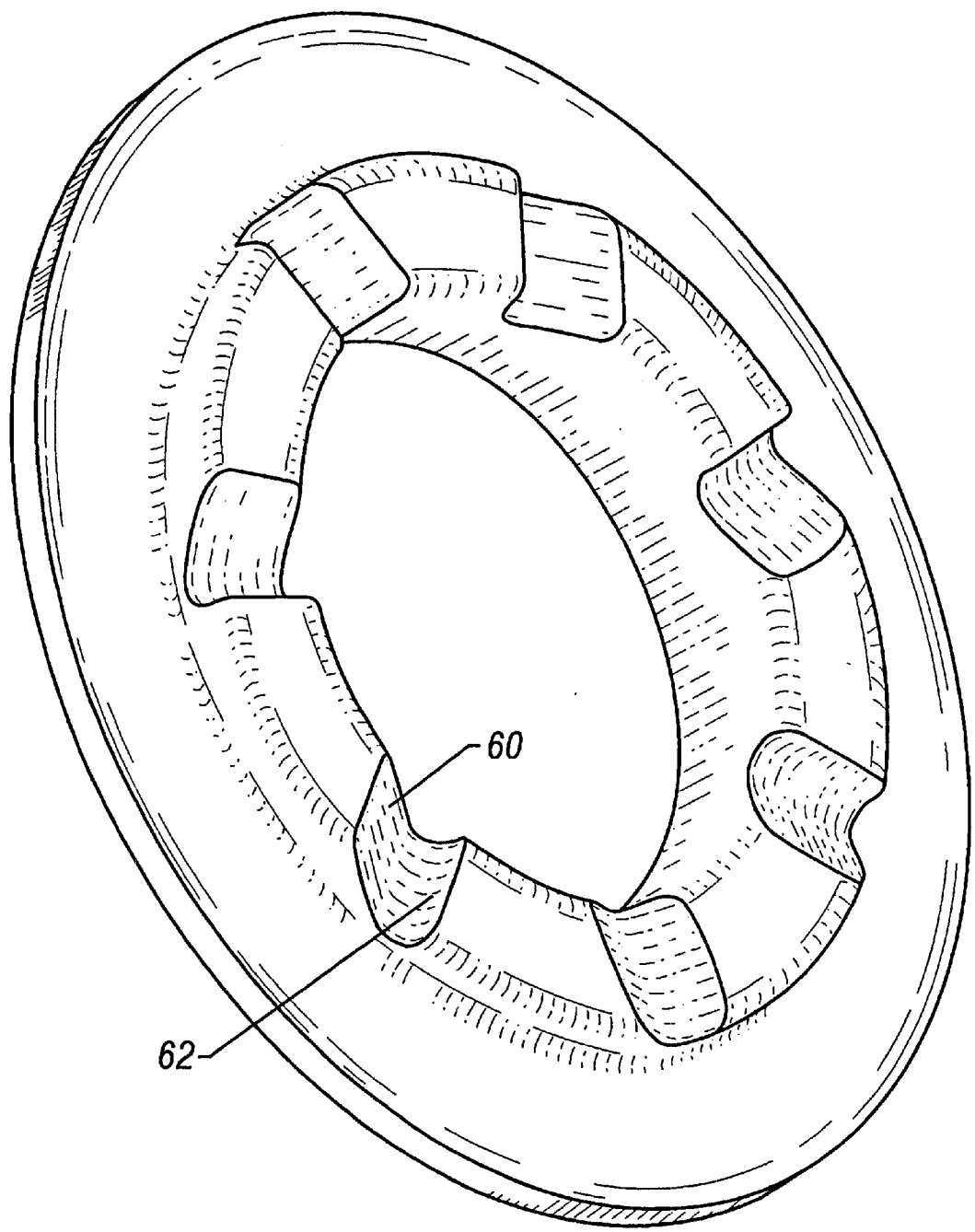
FIG. 2 is a perspective view of the friction ring.
Figure 3:
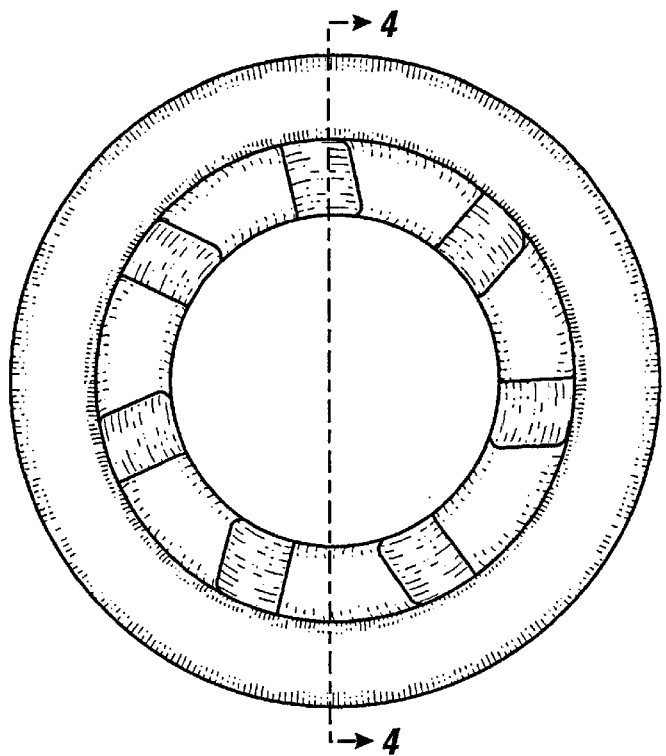
FIG. 3 is a top view of the friction ring.
Figure 4:
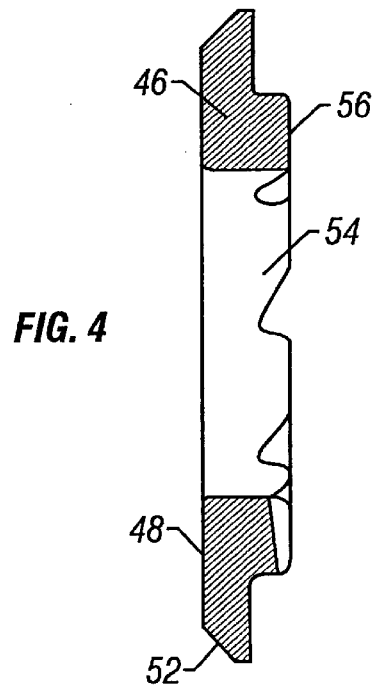
FIG. 4 is a section along plane 4—4 of FIG. 3.

The friction ring is illustrated in detail in FIGS. 2–4 and will be made of a suitable elastomeric material which allows the ring to be compressed and distorted during the application of the cap 40 to the bonnet. Such distortion permits the friction ring to avoid the problem of thermal cycling as well as insuring that the cap will be easier to install than it is to remove. The friction ring 42 has a body 46 with an outwardly facing surface 48 which will be directly adjacent and in contact with an interior surface 50 of the cap 40. The outer edge of the friction ring 42 has a beveled surface 52 which will be facing toward the interior periphery of the cap 40. The friction ring will be of a size to be slightly distorted when it is inserted into the recess of the cap, thereby insuring that the ring stays within the cap during assembly.

The friction ring has an interior opening 54 which is directly surrounded by a plurality of uniformly spaced projections or lugs 56 which extend toward a surface 58 on the bonnet 22. As shown in FIG. 1, these projections will be compressed against the surface 58 when the cap assembly is applied to the body 10.

Each of the lugs 56 extend radially outwardly from the opening 54, but terminate a radial distance less than that of the body 46 with the result that there is a greater surface of the friction ring in contact with the interior of the cap 40 than there is in contact with the surface 58 of the bonnet 22. Thus, there is less torque applied to the bonnet than there is on the cap. Although the axial load is the same, the substantial difference in radii provide a difference in applied load.

Each lug includes a sloped surface 60 which faces the direction of rotation of the cap as it is applied to the bonnet. There is a more abrupt surface 62 on each lug, which abrupt surface, approaching the perpendicular, faces the direction of cap rotation when the cap is being removed. The sloped surface or ramp 60, which faces the direction of cap rotation, provides a smooth transition as the stop cap is assembled on the body, allowing for easy installation of the cap assembly onto the body. In contrast, the more abrupt surface 62 which faces the direction of rotation during cap removal requires a slight increase in torque to loosen the stop cap. Thus, the cap is easier to put on than it is to take off. The slope side of each of the lugs provides a progressively increasing pad of elastomer for compression during cap assembly. In contrast, the abrupt surface 62 provides the opposite result during cap removal. The elastomer provides a friction ring having a relatively high coefficient of friction, a requirement during both removal and attachment.

During assembly, the friction ring will be positioned in the stop cap and the stop cap will be rotatably attached to the body. As the stop cap is so turned, the elastomer in the friction ring is progressively and increasingly compressed and distorted, but this is a smooth transition and requires no sudden increase in torque. In contrast, during removal, the abrupt surface requires a slight increase in torque over what is required in attachment. The result of the elastomeric friction ring and the configuration thereof allows the cap to resist thermal cycling and the cap remains firmly attached at all times. Further, the increased torque required for removal assists in the prevention of vandalism.

Whereas the preferred form of the invention has been shown and described herein, it should be realized that there may be many modifications, substitutions and alterations thereto.

The embodiments of the invention in which an exclusive property or privilege is claimed are as follows:

1. A control stop for use in a plumbing supply line including a body, an inlet and outlet in said body, a valve seat in said body and a valve member movable toward and away from said valve seat to control flow from said inlet to said outlet, an opening in said body providing exterior access to said valve member for adjustment thereof, the improvement comprising a cap assembly for said opening, said cap assembly including a cap having means thereon to rotatably attach the cap to said body about said opening, said cap having an interior surface which faces said body, an elastomeric friction ring positioned between said cap interior surface and said body, said friction ring having a plurality of circumferentially spaced projections facing and in contact with said body, which projections are formed and adapted to require less torque when said cap is rotatably attached to said body than when said cap is rotatably removed from said body.

2. The control stop of claim 1 wherein each friction ring projection has a sloped side which faces the direction of cap rotation during attachment thereof.

3. The control stop of claim 2 wherein each friction ring projection has an abrupt side which faces the direction of cap rotation during removal thereof.

4. The control stop of claim 1 wherein said projections are uniformly circumferentially spaced about said friction ring.

5. The control stop assembly of claim 1 wherein said friction ring has an interior opening, with said projections being directly adjacent said interior opening.

6. The control stop of claim 5 wherein each of said projections has a radial width less than the radial distance between said opening and the exterior periphery of said friction ring.

7. A cap assembly for closing an access opening a plumbing fitting, said cap assembly including a cap having means thereon to rotatably attach the cap to said plumbing fitting about an access opening thereof, said cap having an interior surface which faces said plumbing fitting, an elastomeric friction ring positioned between said cap interior surface and the plumbing fitting, said friction ring having a plurality of circumferentially spaced projections facing and adapted to be in contact with said plumbing fitting, which projections are formed and adapted to require less torque when said cap is rotatably attached to the plumbing fitting than when said cap is rotatably removed from the plumbing fitting.

8. The cap assembly of claim 7 wherein each friction ring projection has a sloped side which faces the direction of cap rotation during attachment thereof.

9. The cap assembly of claim 8 wherein each friction ring projection has an abrupt side which faces the direction of cap rotation during removal thereof.

10. The cap assembly of claim 7 wherein said projections are uniformly circumferentially spaced about said friction ring.

11. The cap assembly of claim 7 wherein said friction ring has an interior opening, with said projections being directly adjacent said interior opening.

12. The cap assembly of claim 11 wherein each of said projections has a radial width less than the radial distance between said opening and the exterior periphery of said friction ring.

* * * * *